(12) United States Patent
Smith et al.

(10) Patent No.: US 7,427,179 B2
(45) Date of Patent: Sep. 23, 2008

(54) DAMPING PRODUCTS AND PROCESSES

(75) Inventors: Kevin Scott Smith, Huntersville, NC (US); Matthew A. Davies, Charlotte, NC (US); T. Phillip Jacobs, Jr., Knoxville, TN (US)

(73) Assignee: University of North Carolina at Charlotte, Charlotte, NC (US)

( * ) Notice: Subject to any disclaimer, the term of this patent is extended or adjusted under 35 U.S.C. 154(b) by 45 days.

(21) Appl. No.: 10/825,641

(22) Filed: Apr. 15, 2004

(65) Prior Publication Data

US 2005/0232718 A1  Oct. 20, 2005

(51) Int. Cl.
*B23B 29/02* (2006.01)

(52) U.S. Cl. ........................................ 409/141; 408/143

(58) Field of Classification Search .................. 409/141, 409/232, 234; 408/143, 239 A; 74/54, 574.4; *B23B 29/02*
See application file for complete search history.

(56) References Cited

U.S. PATENT DOCUMENTS

| | | | | |
|---|---|---|---|---|
| 4,382,587 A * | 5/1983 | Heinrich et al. | ............. | 267/160 |
| 4,527,008 A * | 7/1985 | Hawkins et al. | ................ | 174/42 |
| 4,554,402 A * | 11/1985 | Hawkins et al. | ................ | 174/42 |
| 4,711,610 A * | 12/1987 | Riehl | .......................... | 409/141 |
| 4,825,983 A * | 5/1989 | Nakanishi | .................... | 188/378 |
| 5,143,493 A * | 9/1992 | Najima et al. | ................ | 409/141 |
| 5,228,468 A * | 7/1993 | Kapadia | ......................... | 137/1 |
| 5,322,304 A * | 6/1994 | Rivin | ......................... | 279/103 |
| 6,280,126 B1* | 8/2001 | Slocum et al. | .............. | 409/141 |
| 6,599,068 B1* | 7/2003 | Miyazawa | .................... | 409/234 |
| 2004/0113133 A1* | 6/2004 | Geissele et al. | ................ | 254/43 |
| 2006/0016649 A1* | 1/2006 | Gordaninejad et al. | ...... | 188/267 |

FOREIGN PATENT DOCUMENTS

WO  WO 01/98008 A1 * 12/2001

OTHER PUBLICATIONS

Schunk, Tendo Hydraulic Toolholders, Website Apr. 15, 2004.

* cited by examiner

*Primary Examiner*—David P. Bryant
*Assistant Examiner*—Eric A Gates
(74) *Attorney, Agent, or Firm*—Kilpatrick Stockton LLP

(57) ABSTRACT

Products and processes for forming assemblies are disclosed. One product described comprises a first element having a structured surface adapted to be coupled with a second element.

16 Claims, 6 Drawing Sheets

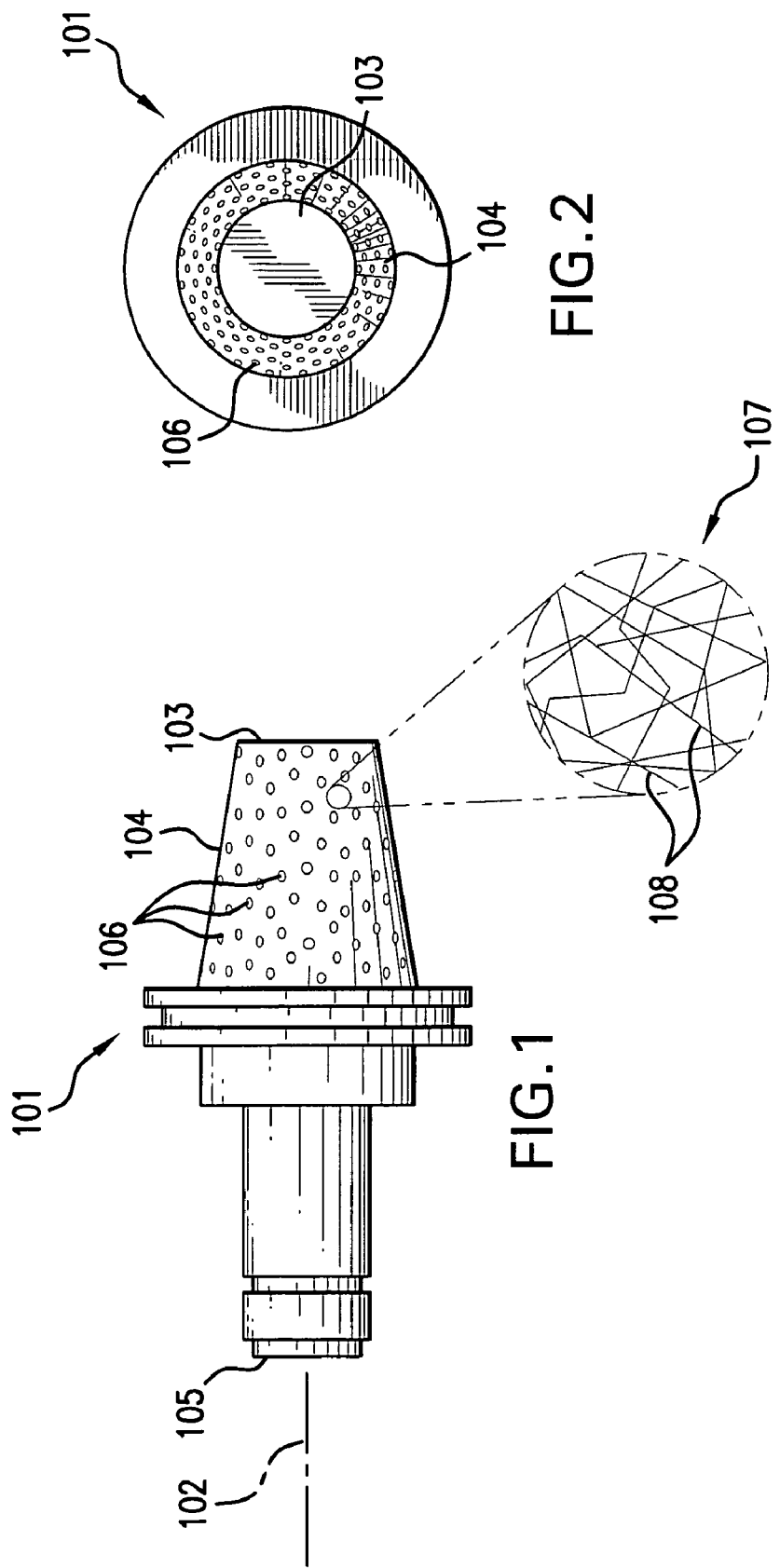

DAMPING PRODUCTS AND PROCESSES

FIELD OF THE INVENTION

The invention relates generally to damping of structures.

BACKGROUND

When connecting elements to form a structure, typical design efforts concentrate on the geometry of the interface and the static stiffness of the resulting connection. These design efforts attempt to match the complementary surfaces of each connecting element as closely as possible, and to provide the smoothest connection surfaces possible. Attempting to produce elements with these qualities requires strict tolerances and precise machining. Thus, such efforts are labor intensive, time consuming, and involve sophisticated machinery. Moreover, connections formed in this manner, while generally stiff and dimensionally accurate, have little or no damping.

The machining performance of a tool typically is a function of the dynamic stiffness of its structure. Dynamic stiffness is a measure of both the static stiffness of a connection, and the damping of the connection. Thus, while a connection may have increased static stiffness, the machining performance of a connection formed with little or no damping suffers.

Damping of a structure is commonly accomplished through the use of tuned mass dampers, increased numbers of connection interfaces, loosening of existing joints, or placement of shock absorbing materials between elements, each of which adds expense or complexity, as well as decreasing the static stiffness of the affected connections. Thus, what is needed is a statically stiff connection that has improved damping.

SUMMARY OF THE INVENTION

The invention provides products and processes for damping, such as products and processes for forming connections with both static stiffness and damping. In one exemplary embodiment of the present invention, an apparatus comprises a first element adapted to be coupled with a second element. The first element comprises a structured surface and the second element comprises a second surface. In one exemplary embodiment, the second surface comprises a receiving surface.

In another exemplary embodiment of the present invention, an apparatus comprises a first element adapted to be coupled with a second element and means for damping. The first element comprises a first surface. The damping means is disposed on the first surface of the first element.

In still another exemplary embodiment of the present invention, a method comprises structuring a first surface of a first element. The first element is adapted to be coupled with a second element.

In yet another exemplary embodiment of the present invention, a method comprises coupling a first element and a second element. The first element comprises a structured surface.

Embodiments of the present invention provide various advantages. One advantage of the present invention can be to provide a coupled apparatus having an increased damping ability.

Another advantage of the present invention can be to reduce the level of vibration between a structured element and a receiving element.

Yet another advantage of the present invention can be to reduce noise transmission in a connection.

Still another advantage of the present invention can be to increase the machining performance of a machine tool holder.

A further advantage of the present invention can be to increase the durability of a machine tool holder.

Still a further advantage of the present invention can be to provide vibration-reducing connections without utilizing apparatuses external to the connection such as tuned dampers, while maintaining accurate positioning between the elements.

These exemplary embodiments are mentioned not to limit the invention, but to provide an example of an embodiment of the invention to aid understanding. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

FIG. 1 is a side-view of a first element according to one embodiment of the present invention.

FIG. 2 is an end-view of the first element according to one embodiment of the present invention.

DETAILED DESCRIPTION OF THE INVENTION

Figure 3:
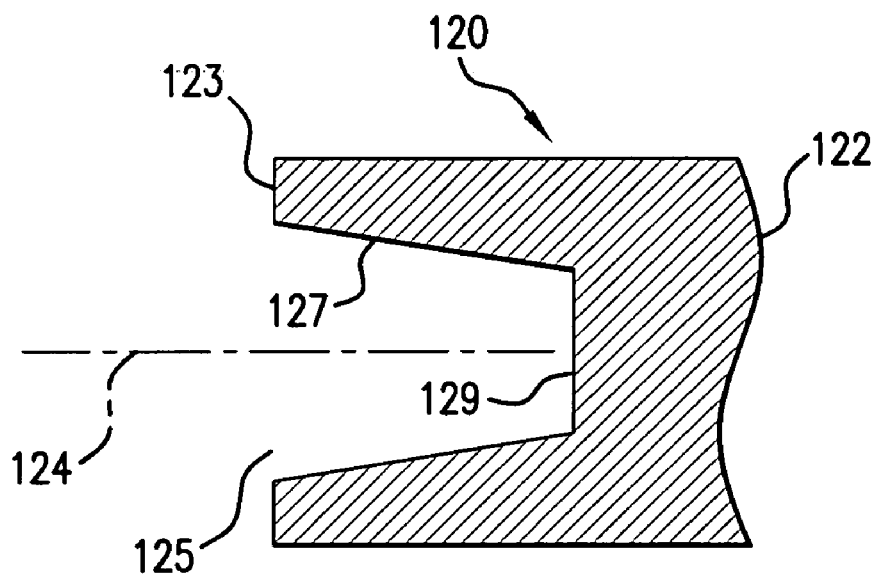
FIG. 3 is a cross-sectional side-view of a second element according to one embodiment of the present invention.

Embodiments of the present invention include products and processes for forming an apparatus of separate elements. The present invention may be used in connections between elements in embodiments in which damping is desired, such as for example, in machine tools; aerospace, maritime, construction or automotive components; civil structures; military applications, and optical devices. Such connections may also require statically stiff connections and precise tolerances. The principles of the present invention can be applied to embodiments in addition to those described herein.

Various apparatuses and methods in accordance with the present invention may be carried out. The invention may be implemented, for example, in one embodiment by coupling a first element comprising a structured first surface with a second element comprising a receiving second surface to form an assembly. In one embodiment, the structured first surface is adapted to be coupled with the receiving second surface. The structured surface may comprise any of a variety of structures, such as a plurality of substantially hemispherical depressions, a plurality of grooves, or other suitable structures. The receiving second surface may be any suitable configuration. Examples include substantially uniform, substantially heterogeneous, or any other suitable configuration. A viscous fluid may be disposed, if desired, on the structured first surface, and/or the second surface. In one embodiment, the structured first surface engages the receiving second surface. In one embodiment, the structured first surface is disposed adjacent to the receiving second surface.

Referring now to FIG. 1, a side-view of a first element 101 according to the principles of the present invention is shown. In the present exemplary embodiment, the first element 101 comprises a machine tool holder and is generally cylindrical in shape, comprising a central axis 102. Alternatively, the first element 101 may comprise other suitable devices or configurations. Preferably, the first element 101 is fashioned from steel. Alternatively, other suitable materials may be used to fabricate first element 101. As will be described in more detail below, the first element 101 is adapted to be coupled with a second element 120 (see FIG. 3).

Referring still to FIG. 1, the first element 101 comprises a first end 103 and a second end 105. The first and second ends 103,105 are disposed in facing opposition to one another. The first element 101 comprises a first surface 104. The first surface 104 is disposed proximate the first end 103. In the embodiment shown, the first end 103 is adapted to contact the second element 120, and second end 105 is adapted to contact a machine tool. The first surface 104 comprises a conical surface. In alternative embodiments of the present invention, first surface 104 comprises other suitable shapes, including for example, a plane, a cylinder, a ball, a pyramid, and an ovoid.

Preferably, the first surface 104 comprises a structured surface. The first surface 104 shown comprises a structured surface. A structured surface comprises an engineered feature, set of features, or combination of features, disposed at, on, proximate to, or beneath the first surface 104, that increases energy absorption at an interface during dynamic loading. For example, a structured surface may comprise a prescribed variation, irregularity, or discontinuity in, on, or proximate to an otherwise substantially flat, continuous, or uniform surface. In one embodiment, a structured surface may comprise a prescribed variation formed in, on, proximate to, or beneath the surface, such as grooves, depressions, scratches, pits, bumps, or raised portions or projections.

Structured surfaces can also be observable to the human touch or unaided eye. In some embodiments, structured surfaces may only be observed with the aid or devices used to detect surface or material irregularities or flaws. Structured surfaces, however, typically do not include flaws, irregularities, variations, or discontinuities that are present naturally or incidental to forming or machining the material or surface.

In the embodiment shown, the first surface 104 comprises a plurality of depressions 106. The depressions 106 are substantially hemispherical. In alternative embodiments of the present invention, first surface 104 may be structured with many different types of structures, including, but not limited to material additions, depressions, channels, scratches, slots, or grooves. In one embodiment, the first surface 104 comprises a plurality of grooves. Preferably, the depressions 106 are arranged in a non-uniform pattern. The depressions or other means for damping may be arranged in a substantially uniform pattern. In the embodiment shown, the depressions 106 are formed by machining, for example, by using a drill press. In an alternate embodiment, the first surface 104 may be structured using other suitable methods, including, but not limited to milling, sanding, grinding, cutting, etching, knurling, shot-peening, or vapor deposition.

Referring now to FIG. 2, an end-view of the first element 102 is shown. The first end 103 is shown at the center of first element 102. In the embodiment shown, the first end 103 is a substantially uniform and flat circular surface. In other embodiments, the first end 103 comprises a generally irregular surface, as well as other shapes. In one embodiment, the first end 103 comprises a structured surface. FIG. 2 also shows the first surface 104 comprising the depressions 106 as described with reference to FIG. 1. In the embodiment shown, the first surface 104 comprises a structured surface structured with the depressions 106. The first surface 104 comprises a conical shape. As described with reference to FIG. 1, first surface 104 may comprise other suitable shapes.

The embodiment shown in FIGS. 1-5 includes a means for damping. In the present exemplary embodiment, the means for damping is disposed on the first surface 104 of the first element 101. The means for damping in the embodiment shown in FIG. 1 includes a plurality of depressions 106. Other means for damping may be used in other embodiments, for example, a plurality of material additions, depressions, channels, scratches, slots and/or grooves. Structures described herein for damping, or other structures may be used. Any suitable structure that can increase the damping of a coupling may be used.

In the embodiment shown, a viscous fluid (not shown) is disposed on the first surface 104 of first element 101. In one embodiment, the viscous fluid comprises a grease. In one embodiment, the viscous fluid forms a substantially uniform layer over the entire first surface 104. In another embodiment, the viscous fluid is applied to portions of the structured surface. Alternatively the viscous fluid is not disposed on the first surface 104.

Referring now to FIG. 3, a cross-sectional side-view of a second element 120 is shown. In the present exemplary embodiment, the second element 120 comprises a machine tool collet adapted to receive the first element 101. The second element shown 120 comprises a first end 122 and a second end 123. In the present exemplary embodiment, the second element 120 comprises a central axis 124. In the present exemplary embodiment, the first end 123 fixably connects to a machine tool drive shaft (not shown), the second end 124 is adapted to be disposed adjacent to the first element 101 (see FIG. 1). The second element shown 120 is substantially cylindrical in shape, centered on the central axis 124; alternatively, other suitable geometries and configurations may be used.

In the embodiment shown, the second element 120 is fashioned from steel. In alternative embodiments, the second element may be fashioned from other suitable materials, including, but not limited to polymers, aluminum, stone or wood. The second end 124 includes a conical receptacle 125 defined by a second surface 127 and a receiving end 129. The receptacle 125 shown is formed in the second element 120 such that it forms a substantially secure connection when coupled with the first element 101. This is accomplished in the embodiment shown by forming the second surface 127 of the second element 120 such that it is complementary to first surface 104, comprising a similar size, shape and geometry to facilitate a dimensionally accurate apparatus when the first and second elements 101 and 120 are coupled. In another embodiment, the receptacle 125 is adjusted by mechanical means to complement a differently sized or shaped first element 101.

Preferably, the first element 101 is adapted to be coupled with the second element 120 comprising a second surface 127. The second surface 127 shown comprises a receiving surface. A receiving surface is a surface adapted to receive a structured surface. Preferably, the first surface 104 is adapted to be coupled with second surface 127. In the embodiment shown, the first surface 104 is disposed adjacent to the second surface 127. The first end 103 of the first element is disposed adjacent to the receiving end 129.

Preferably, second surface 127 is substantially uniform and not structured. Alternatively, the second surface 127 is structured, such as in a manner similar to first surface 104. In another embodiment, the second surface 127 is structured in a manner different than the first surface 104. In another alternate embodiment, the second surface 127 is structured and the first surface 104 is not structured. In alternative embodiments of the present invention, second surface 127 may be structured by a number of methods, such as that described above with reference to the first element 101.

Figure 4:
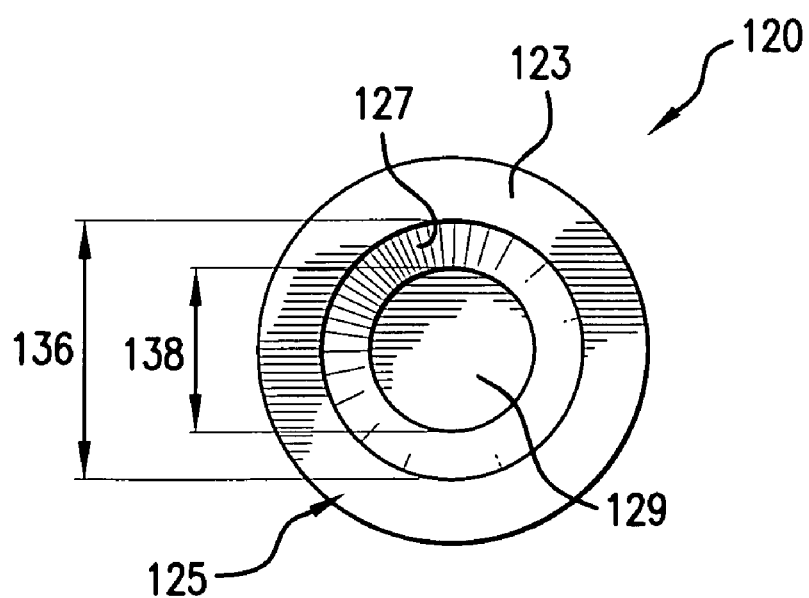
FIG. 4 is an end-view of the second element according to one embodiment of the present invention.

Referring now to FIG. 4, an end-view of the second element 120 is shown. In the embodiment shown, the first end 123 is a substantially uniform and flat circular ring around the receptacle 125. In other embodiments, the first end 123 comprises a generally irregular surface, as well as other suitable shapes. The first end 123 may also comprise a structured surface as described with reference to FIG. 1. The receptacle 125 is generally visible at the center of the first end 123. In other embodiments, the receptacle 125 is disposed in the first end 123 off-center with respect to the central axis 124 as shown in FIG. 3.

Referring still to FIG. 4, the receiving end 129 is shown generally at the center of the receptacle 125. In the embodiment shown, the receiving end 129 comprises a substantially uniform and flat circular surface. In other embodiments, the receiving end 129 is disposed in the receptacle 125 off-center with respect to the central axis 124 as shown in FIG. 3. The receiving end 129 may also comprise a generally irregular surface, as well as other suitable shapes. In one embodiment, the receiving end 129 comprises a structured surface as described with reference to FIG. 1. FIG. 4 also shows the second surface 127. The second surface 127 is substantially conical in shape, tapering from a first diameter 136 adjacent to the first end 123 to a second diameter 138 adjacent to the receiving end 129. As shown, the first diameter 136 is greater than the second diameter 138.

Figure 5:
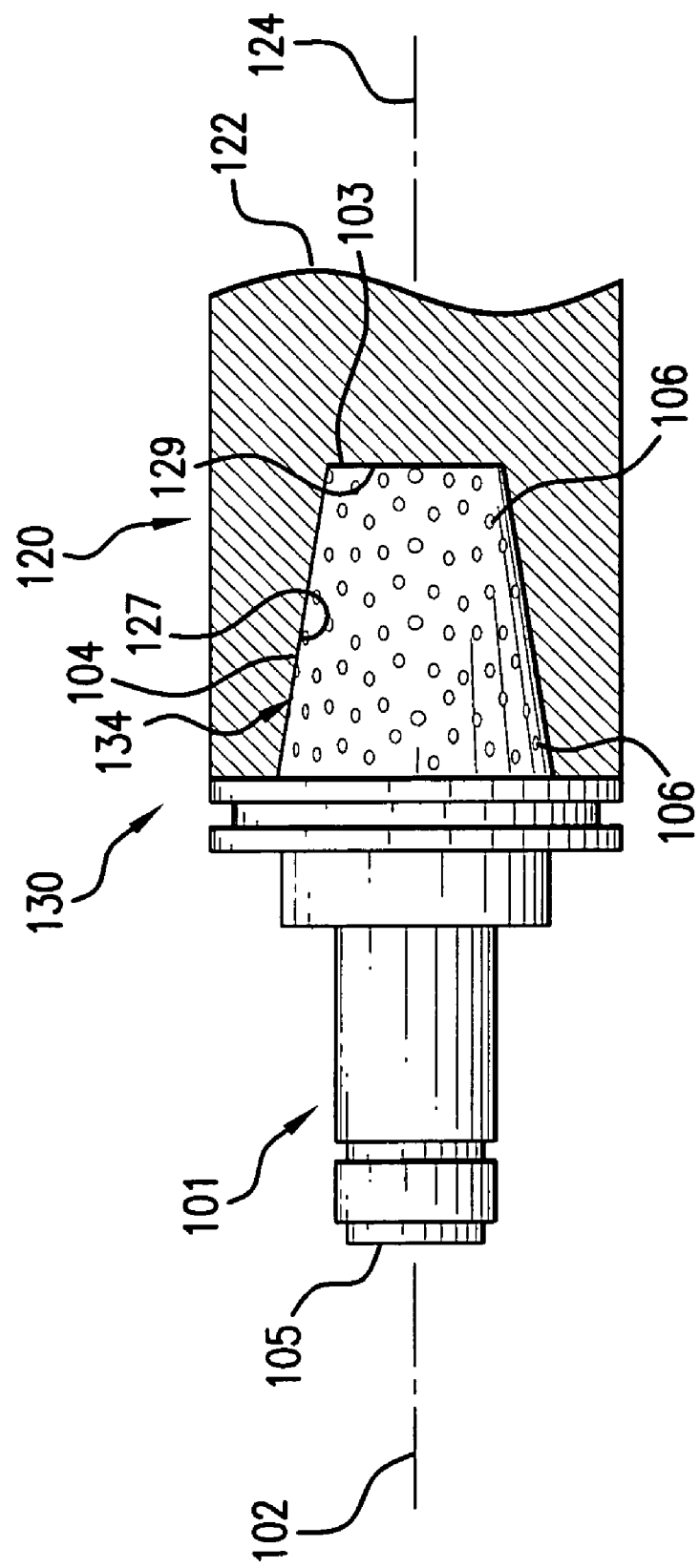
FIG. 5 is a cut-away side-view of an apparatus according to one embodiment of the present invention.

Referring now to FIG. 5, a cut-away side-view of the apparatus 130 is shown. The first surface 104 of the first element 101 is coupled with the second surface 127 of the second element 120 to form the apparatus 130. In the embodiment shown, first element 101 is directed toward second element 120 until first surface 104 is adjacent to second surface 127, forming apparatus 130. In the present exemplary embodiment, central axis 102 of first element 101 is substantially co-axial with central axis 124 of second element 120 when first and second elements 101 and 120 are coupled. Alternatively, first and second elements 101 and 120 are not co-axial. In alternative embodiments of the present invention, other means for coupling first element 101 and second element 120 may be used, including, but no limited to, a conveyor belt, a hydraulic ram, a compressed air tool, a vice, a gravity-powered ramp, or a chute.

The first surface 104 of the first element 101 is engaged with the second surface 127 of the second element 120. The second surface 127 comprises a receiving surface of the second element 120.

In the present exemplary embodiment, apparatus 130 is an operable machine tool holder and spindle assembly, capable of cutting or milling with a variety of machine tools (not shown). In alternative embodiments of the present invention, apparatus 130 may be other suitable structures where both static stiffness and damping are desired, including, but not limited to joints, bushings, and screw assemblies.

In the embodiment shown, although first surface 104 is structured with hemispherical depressions 106, it is still dimensionally accurate with respect to second surface 127 of second element 120. First surface 104 and second surface 127 form a substantially secure connection between first and second elements 101 and 120, and imparting apparatus 130 with sufficient static stiffness to perform its intended function.

In the embodiment shown, when first element 101 and second element 120 are connected to form apparatus 130, where first surface 104 meets second surface 127, a connection interface 134 exists. The hemispherical depressions 106 of first element 101 are adapted to retain a viscous fluid between first surface 104 and second surface 127. The viscous fluid may enhance the damping of apparatus 130. In alternative embodiments, other viscous liquids may be applied to first surface 104 prior to coupling with second surface 127 of second element 120 to form apparatus 130.

Figure 6:
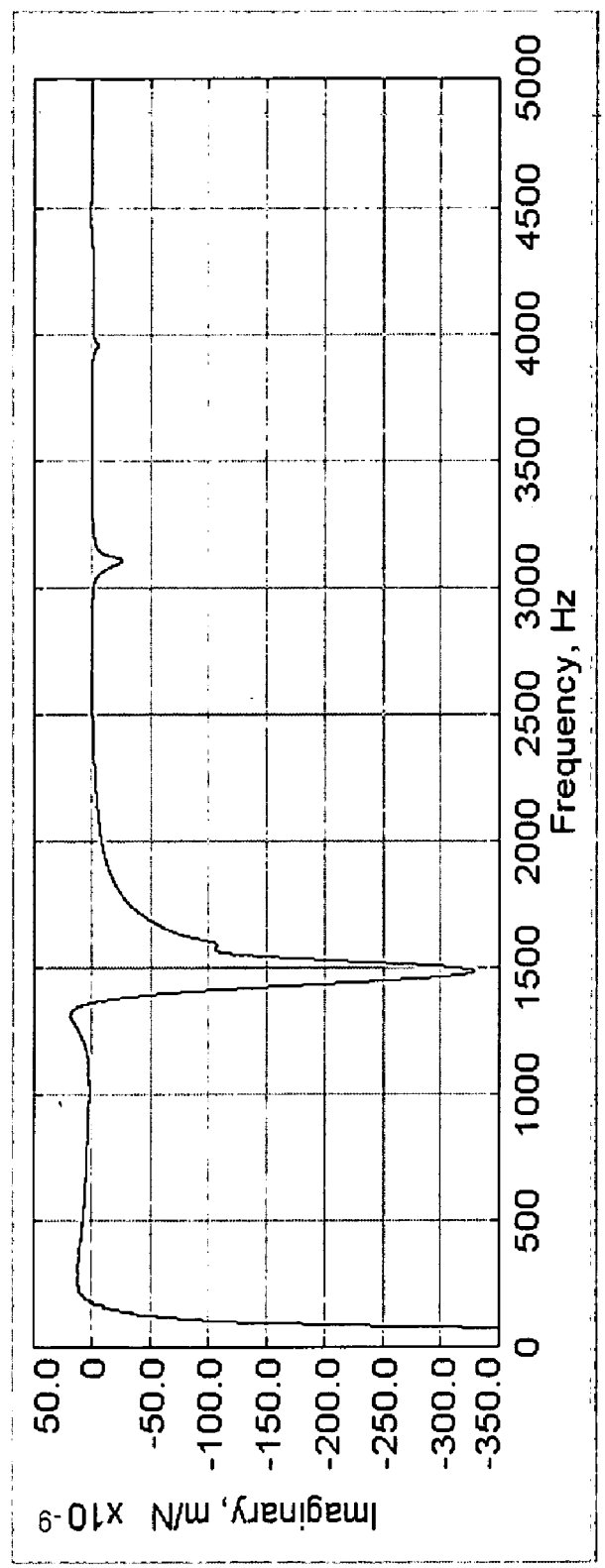
FIG. 6 is a graph showing the damping properties of an embodiment of the present invention.
Figure 7:
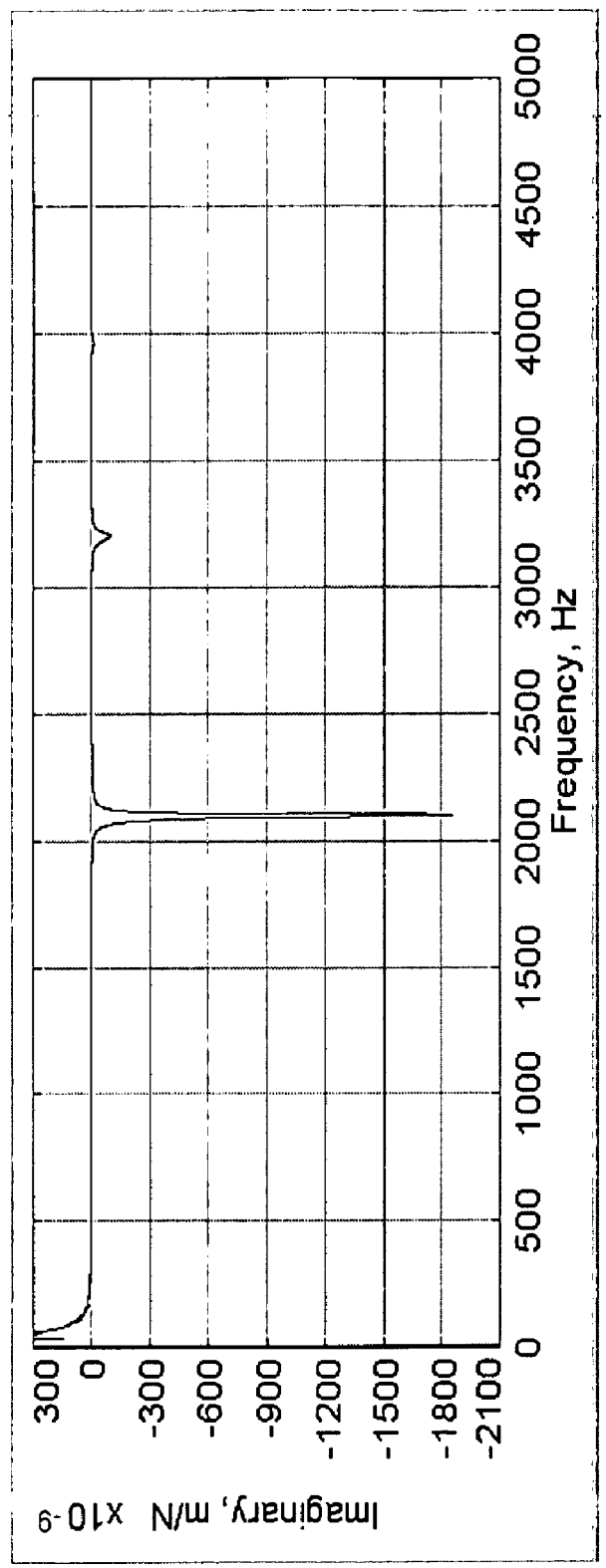
FIG. 7 is a graph showing the damping of a prior product.

As shown in FIGS. 6 and 7, the structuring of the first surface 104 provides the apparatus 130 with a marked improvement in damping over a tool holder with an unstructured and substantially uniform surface. FIG. 6 illustrates the damping performance of an apparatus 130 employing one embodiment of the present invention. In this embodiment, damping is measured by applying a measured force perpendicular to the apparatus 130 proximate the second end 105 of the first element 101 while the apparatus 130 is operating, and noting the frequency and magnitude of the resultant vibration.

As shown in FIG. 6, a measured force of 12 kilo-Newtons was applied to an apparatus 130 comprising a first element 101 comprising a first surface 104. FIG. 7 illustrates the damping performance of a conventional apparatus 130 comprising an unstructured, but otherwise identical first element 101. As shown in FIG. 6, the apparatus 130 comprising a structured surface exhibits a maximum stiffness of approximately −325 nanometers per Newton, and a natural frequency of about 1450 Hertz. As shown in FIG. 7, the conventional apparatus without a structured surface exhibits a maximum stiffness of approximately −1900 nanometers per Newton, and a natural frequency of about 2100 Hertz. FIGS. 6 and 7 show that, in one embodiment, an apparatus 130 comprising a structured surface comprises an ability to absorb energy approximately 6 times more effectively than a similar device comprising a non-structured surface.

Figure 8:
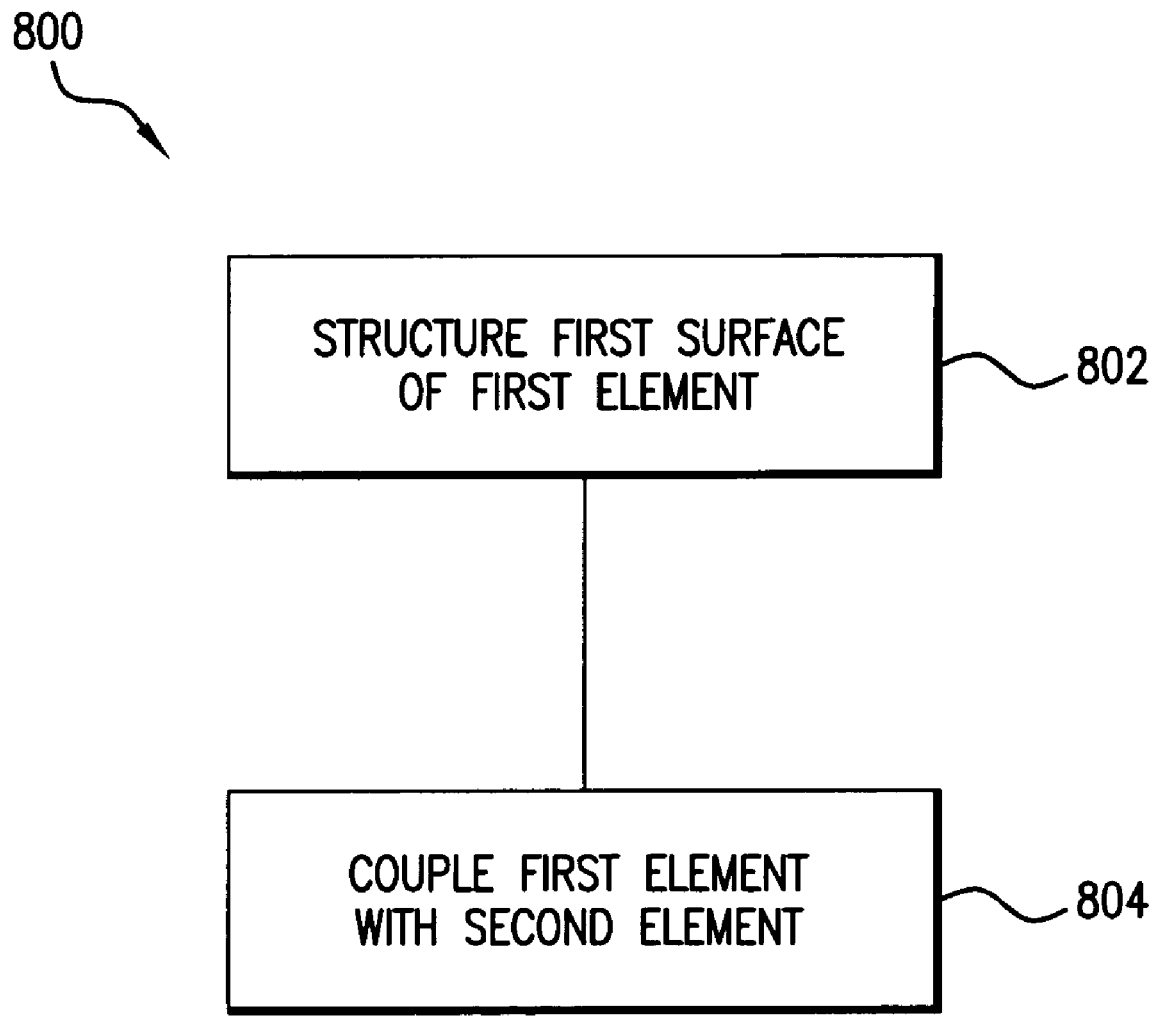
FIG. 8 is a block diagram of a method according to an embodiment of the invention.

Referring now to FIG. 8, a block diagram of a method 800 according to an embodiment of the invention is shown. FIG. 8 shows an embodiment of a method that may be used to connect elements to form a structure, as described above. However, the method 800 may be used to form alternate structures or connections. Items shown above in FIGS. 1-5, as well as the accompanying description above, are referred to in describing FIG. 8 to aid understanding of the embodiment of the method 800 shown. Thus, the method 800 is not limited to the embodiments described above and with reference to FIGS. 1-5.

As indicated by block 802, the method 800 shown comprises structuring a first surface of a first element. The first element is adapted to be coupled with a second element. In one embodiment, the first element comprises a machine tool holder, such as that described above with reference to FIGS. 1-5. Alternatively, the first element may comprise other suitable structures. In one embodiment, the first surface is structured as described above. For example, depressions are formed in the first surface. The depressions may be substantially hemispherical.

As indicated by block 804, the method 800 shown comprises coupling the first element with a second element to form an apparatus. The second element comprises a second surface. The second surface may comprise a receiving surface. The receiving surface may be substantially uniform. In one embodiment, the first surface of the first element is disposed adjacent to the receiving surface of the second element when the first and second elements are coupled. In one such embodiment, the first surface of the first element engages the receiving surface of the second element when the first and second elements are coupled. In one embodiment, the second element comprises a collet adapted to receive a machine tool holder, such as that described above with reference to FIGS. 1-5. Alternatively, the first element may comprise other suitable structures.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. A machine tool damping apparatus comprising: a first element adapted to be coupled with a second element, the first element comprising a structured surface and the second element comprising a collet having a second surface, wherein the second surface comprises a receiving surface that is substantially uniform and wherein the structured surface comprises a plurality of depressions wherein the depressions are formed by machining and wherein the depressions are substantially hemispherical, wherein the structured surface directly contacts the receiving surface.

2. The apparatus of claim 1, wherein the structured surface further comprises a projection.

3. The apparatus of claim 1, wherein a viscous fluid is disposed on the structured surface.

4. The apparatus of claim 1, wherein the depressions are arranged in a non-uniform pattern.

5. A machine tool apparatus comprising: a first element adapted to be coupled with a second element, the first element comprising a first surface and the second element comprising a collet; and means for damping, the damping means disposed on the first surface of the first element wherein the second element comprises a receiving surface for the collet, wherein the first surface is adapted to be coupled with the receiving surface and wherein the first surface directly contacts the receiving surface and wherein the damping means comprises a plurality of depressions disposed in the first surface and wherein the depressions are formed by machining, wherein the depressions are substantially hemispherical.

6. The apparatus of claim 5, wherein the damping means is not a viscous fluid.

7. The apparatus of claim 5, wherein a viscous fluid is not disposed on the structured surface.

8. The apparatus of claim 5, wherein the structured surface further comprises a projection.

9. The apparatus of claim 5, wherein the depressions are arranged in a non-uniform pattern.

10. A method of damping vibrations in a machine tool apparatus comprising a first element and a second element, wherein said method comprises: adapting a first element to be coupled with a second element, the first element comprising a structured surface and the second element comprising a collet having a second surface, the second surface comprising a receiving surface and the structured surface comprising a plurality of depressions and wherein the depressions are formed by machining and wherein the structured surface directly contacts the receiving surface, wherein the depressions are substantially hemispherical.

11. The method of claim 10, further comprising disposing a viscous liquid on the structured surface.

12. The method of claim 10, wherein the structured surface further comprises a projection.

13. The method of claim 10, wherein the depressions are arranged in a non-uniform pattern.

14. A machine tool apparatus comprising: a first element comprising a first end, a second end, and a first surface, wherein the first surface, having a conical shape, is disposed proximate to the first end, and wherein the first surface comprises a structured surface, the structured surface comprising a plurality of substantially hemispherical depressions, and wherein the second end is adapted to contact a machine tool; a second element comprising a distal end and a proximate end, wherein the proximate end comprises a conical receptacle, the conical receptacle being defined by a second surface and a receiving end; wherein the first element is coupled with the second element such that the first end contacts the receiving end of the second element such that the first surface contacts the second surface; wherein the first surface comprises a corresponding size, shape, and geometry as the second surface such that a substantially secure connection is created when the first element is coupled with the second element; wherein the structured surface directly contacts the second surface; and wherein the plurality of depressions provides a means for damping.

15. The apparatus of claim 14, wherein the structured surface further comprises a projection.

16. The apparatus of claim 14, wherein the depressions are arranged in a non-uniform pattern.

* * * * *